Nov. 25, 1924.  
F. L. NANTZ  
CLAMP  
Filed Jan. 11, 1924  
1,517,092
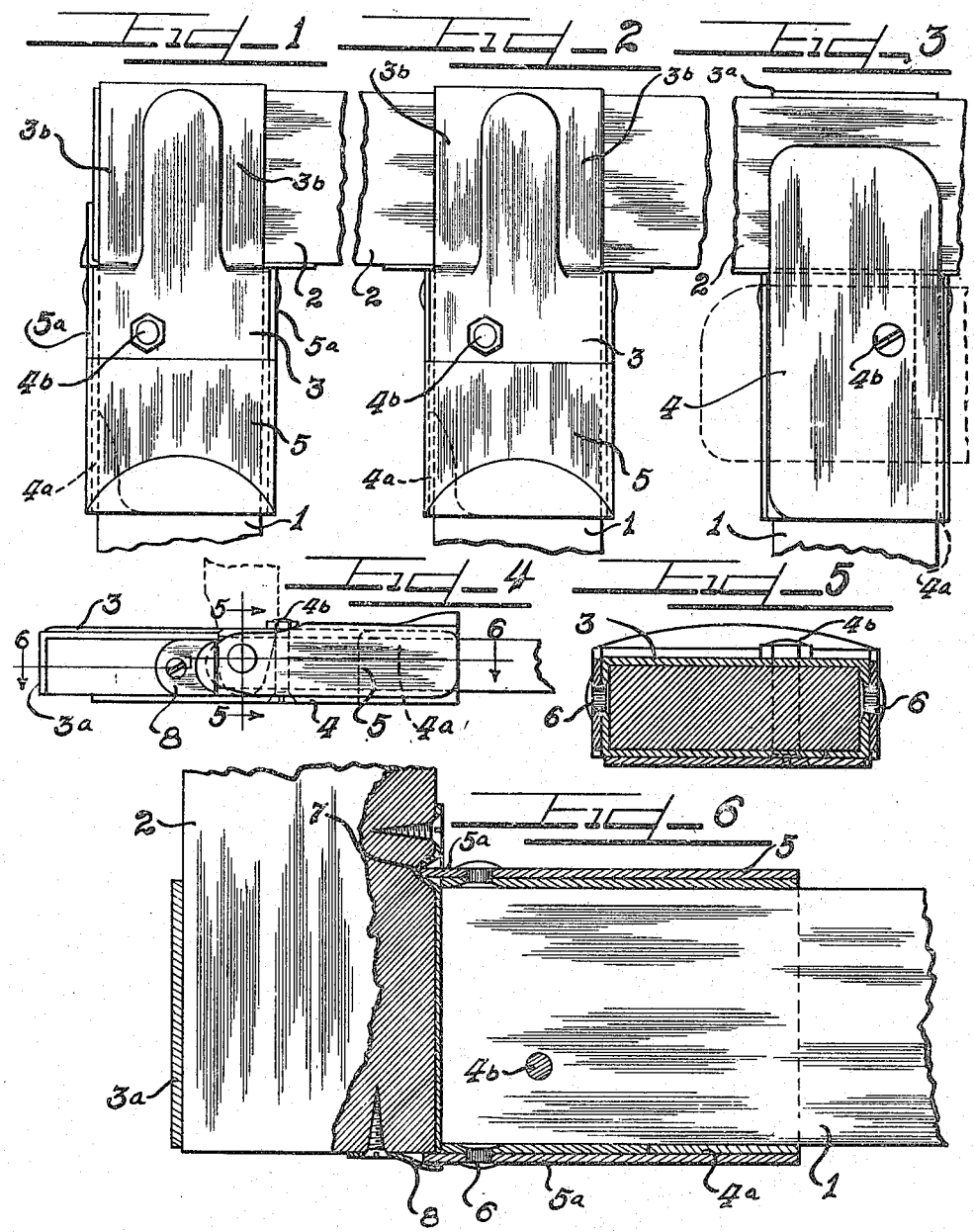

Patented Nov. 25, 1924.

1,517,092

UNITED STATES PATENT OFFICE.

FRANK L. NANTZ, OF WAUKEGAN, ILLINOIS.

CLAMP.

Application filed January 11, 1924. Serial No. 685,631.

*To all whom it may concern:*

Be it known that I, FRANK L. NANTZ, a citizen of the United States, and a resident of the city of Waukegan, in the county of Lake and State of Illinois, have invented certain new and useful Improvements in a Clamp; and I do hereby declare that the following is a full, clear, and exact description of the same, reference being had to the accompanying drawings and to the numerals of reference marked thereon, which form a part of this specification.

This invention relates to a clamp for releasably connecting a pair of members together and is especially adapted for use in demountable frames and structures used by theater companies and the like and which are daily set up and demounted.

It is an object of this invention to provide a clamp that will securely hold the parts together, and that can be quickly released for disconnecting the parts so that the latter can be wrapped up or packed.

It is a further object of this invention to provide such a clamp which remains permanently attached to one of the members, thereby facilitating the assembling of parts and preventing the loss of a clamp.

With these and other objects in view, which will become more apparent in the following description and disclosures, this invention comprises the novel structure and combination of parts hereinafter described and more particularly pointed out and defined in the appended claims.

In the accompanying drawings, which illustrate a preferred embodiment of this invention, and in which similar reference numerals refer to similar features in the different views:

Figure 1 is a rear elevational view of an end clamp connecting a pair of members.

Figure 2 is a view similar to Figure 1 of an intermediate clamp.

Figure 3 is a front elevational view of an intermediate clamp.

Figure 4 is a left hand end elevational view of Figure 1.

Figure 5 is an enlarged sectional view upon the line 5—5 of Figure 4.

Figure 6 is an enlarged sectional view taken substantially upon the line 6—6 of Figure 4.

As shown on the drawings:

In referring now to the drawings, which illustrate one embodiment of this invention, there is illustrated a pair of members 1 and 2 which may be parts of a demountable scenery frame or the like and which it is desired to releasably join or connect at an angle to each other so that the same may be readily disassembled. For this purpose, there are provided clamping elements attached to one member for releasably engaging the second member. In the present instance three clamping elements are provided.

The first clamping element, which is designated by the reference numeral 3, is preferably formed from sheet metal and is so stamped or constructed as to provide a vertical socket for receiving the member 1 to which it is secured and a horizontal open faced socket for loosely receiving the member 2. In the present instance, in which the members 1 and 2 are of rectangular cross section, the clamping member 3 is formed from a sheet metal blank having a relatively broad section that is stamped into channel-like form to encompass the sides of the member 1, and having an upper section substantially the width of the front face of the member 1 that is formed at its upper end with a right angled flange 3ª that overhangs the vertical socket section, the horizontal socket being formed between the flange 3ª and the lateral top portions of the vertical socket with which it communicates. The upper section of the clamping member 3 has its lateral margins slightly stamped inwardly into the horizontal socket, as indicated at 3ᵇ, so as to avoid any looseness and to strengthen the clamp.

The second clamping element, which is designated by the reference numeral 4, is best illustrated in Figure 3 and comprises a flat plate which is pivoted by means of a stud 4ᵇ to the front face of the member 1, the member 3 being secured to the rear face. This clamping element 4 is pivoted intermediate its ends and has a portion extending above the top of the member 1 so as to close the open face of the horizontal socket, leaving, however, sufficient space between its upper edge and the flange 3ª to provide a tacking margin upon the member 2. The clamping element 4 is provided with a rearwardly extending lateral lug or wing 4ª which normally lies adjacent a lateral side of the element 3. When the element 4 is in the full line position shown in Fig. 4, it confines the member 2 in the horizontal socket, but when it is moved or rotated into the dotted line position it releases said member 2, which may then be readily removed.

The third element of the clamp consists of a gripping element 5 which has a lower channel-like section that fits over the element 3. The lateral flanges of the section, however, extend upwardly above the channel section in the form of parallel arms 5ᵃ having rounded or biting ends that extend a suitable distance into the horizontal socket. These arms 5ᵃ are pivoted to the lateral flanges of the element 3 by means of the studs 6 so that the gripping element 5 can be swung or rotated on said pivots to bring the biting ends into depressions 7 formed in the bottom of the member 2. Where the clamp is used at a corner, a clip 8 may be attached to the end of the member 2 to provide a recess therebetween for receiving the biting end of the outer arm 5ᵃ. At intermediate points a pair of recesses such as 7 will of course be used as in Fig. 2. One of the lateral flanges of this gripping element fits over the lug 4ᵃ on the element 4 and locks the same from movement until the gripping element is sufficiently raised to release the lug.

The members 1 and 2, or either one, may be sheathed in metal bushings when the clamps are attached, if desirable, as shown in Fig. 5, and a metal plate may be attached to the under side of the member 2 when the member 1 consists of soft wood or material.

It will be noted that the clamp consists of one stationary element and two elements which may be oscillated at right angles to each other, all of which are secured to the end of one frame member. Now, in order to join the second frame member, such as 2, it is only necessary to swing the gripping element 5 upon its pivots so that the lateral flanges of the channel section will be raised sufficiently to release the lug 4ᵃ and rotate the biting or gripping ends of the arms 5ᵃ below the horizontal socket, as shown in dotted lines in Fig. 4. The element 4 that closes the horizontal socket may then be rotated into the dotted line position shown in Fig. 3, so the front face of the horizontal socket will be unobstructed. The member 2 may then be placed in the horizontal socket by a lateral movement, and when in position, the clamping element 4 may be swung into the full line position shown in Fig. 3. Then the gripping element may be swung downwardly into operative position, the gripping ends of the arms 5 engaging the lower depressed side of the member 2 and forcing the same against the flange 3ᵃ, and the lateral flange taking over the lug 4ᵃ and locking the element 4 from movement. The frame or structure can be readily disassembled by a reverse operation, as is obvious.

It is characteristic of this invention that the clamps are permanently attached to one member and releasably engage the other member and that a structure in which they are used can be quickly assembled and disassembled without much effort or damage to the parts. It will readily be appreciated that in scenery frames for theaters and other portable structures that are designed to be assembled and disassembled, a great deal of time and effort may be saved in the use of such clamping connections.

I am aware that numerous details of construction may be varied through a wide range without departing from the principles of this invention, and I therefore do not purpose limiting the patent granted otherwise than necessitated by the prior art.

I claim as my invention:

1. A clamp comprising a member having an open faced socket adapted for receiving a member, a rotatable member for closing the open face of said socket, and a gripping member pivoted in overlapping relation with the first member and having gripping parts extending into said socket.

2. A clamp comprising a member having a vertical socket and a horizontal open faced socket, a rotatable member for partially closing said open faced socket, and a swingable gripping member having biting portions extending into said open faced socket and having means for locking said rotatable member in operative position.

3. A releasable joint connection for connecting a pair of members at an angle to each other comprising an element attached to one member, and having an open faced socket for receiving the other member, a movable element pivoted to the first member and movable for closing or opening said socket, and a movable gripping element also pivoted to said first member and having parts adapted for engaging the member in the open faced socket.

4. A releasable joint connection for connecting a pair of members at an angle to each other comprising an element attached to one of said members, and having an open faced socket for receiving the second member, a movable element pivoted to the first member and rotatable for closing said open faced socket, and a gripping element also pivoted to the first member and having biting portions for engaging the second member, and having means for locking said movable element in operative position.

5. In a device of the class described, a clamp comprising an element adapted for attachment to a member and having an open faced socket for releasably receiving a second member, a shiftable element for closing said open faced socket for releasably confining said second member, and a pivoted gripping element on the first member movable into and out of gripping engagement with the second member and adapted when in operative position for locking said shiftable element in operative position.

In testimony whereof I have hereunto subscribed my name in the presence of two subscribing witnesses.

FRANK L. NANTZ.

Witnesses:
M. CLIFFORD,
E. K. HILL.